United States Patent [19]
Isman et al.

[11] Patent Number: 5,301,310
[45] Date of Patent: Apr. 5, 1994

[54] PARALLEL DISK STORAGE ARRAY SYSTEM WITH INDEPENDENT DRIVE OPERATION MODE

[75] Inventors: Marshall A. Isman, Newton; Craig W. Stanfill, Waltham; David C. Taylor, Medford, all of Mass.

[73] Assignee: Thinking Machines Corporation, Cambridge, Mass.

[21] Appl. No.: 652,142

[22] Filed: Feb. 7, 1991

[51] Int. Cl.⁵ .................................................. G06F 11/00
[52] U.S. Cl. .................................. 395/575; 371/10.1; 371/68.1
[58] Field of Search .............. 395/575; 371/10.1, 68.1, 371/2.1, 2.2; 364/243, 265

[56] References Cited

U.S. PATENT DOCUMENTS

| | | | |
|---|---|---|---|
| 4,814,973 | 3/1989 | Hillis | 364/200 |
| 4,899,342 | 2/1990 | Potter et al. | 371/10.1 |
| 5,124,987 | 6/1992 | Milligan et al. | 371/10.1 |
| 5,155,845 | 10/1992 | Beal et al. | 371/10.1 X |

Primary Examiner—Robert W. Beausoliel, Jr.
Assistant Examiner—Ly V. Hua
Attorney, Agent, or Firm—Richard A. Jordan

[57] ABSTRACT

A mass storage system for connection to a computer. The mass storage system includes a plurality of independently-controllable storage modules, each storage module having a storage element for storing data in a plurality of storage locations and a retrieval arrangement for retrieving data from selected ones of the storage locations. A word assembly arrangement receives data from the storage modules in parallel and generates in response thereto data words for transfer to the computer system. A system control module selectively enables the retrieval arrangements of the storage modules to retrieve in parallel data from corresponding storage locations of all of the storage elements, or to retrieve data from diverse locations in selected storage modules.

8 Claims, 5 Drawing Sheets

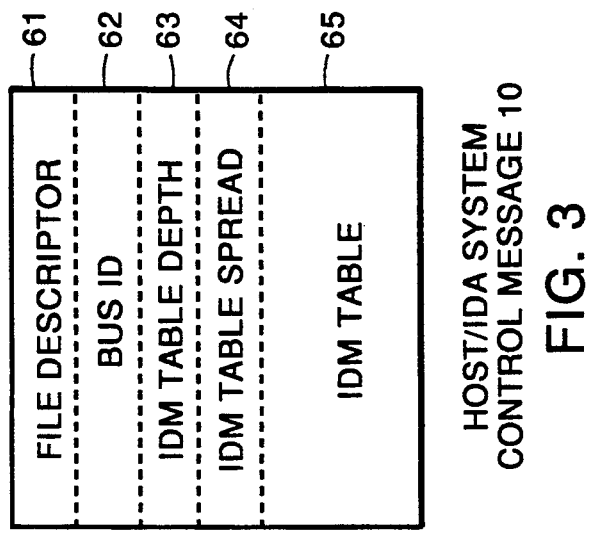
FIG. 3 HOST/IDA SYSTEM CONTROL MESSAGE 10
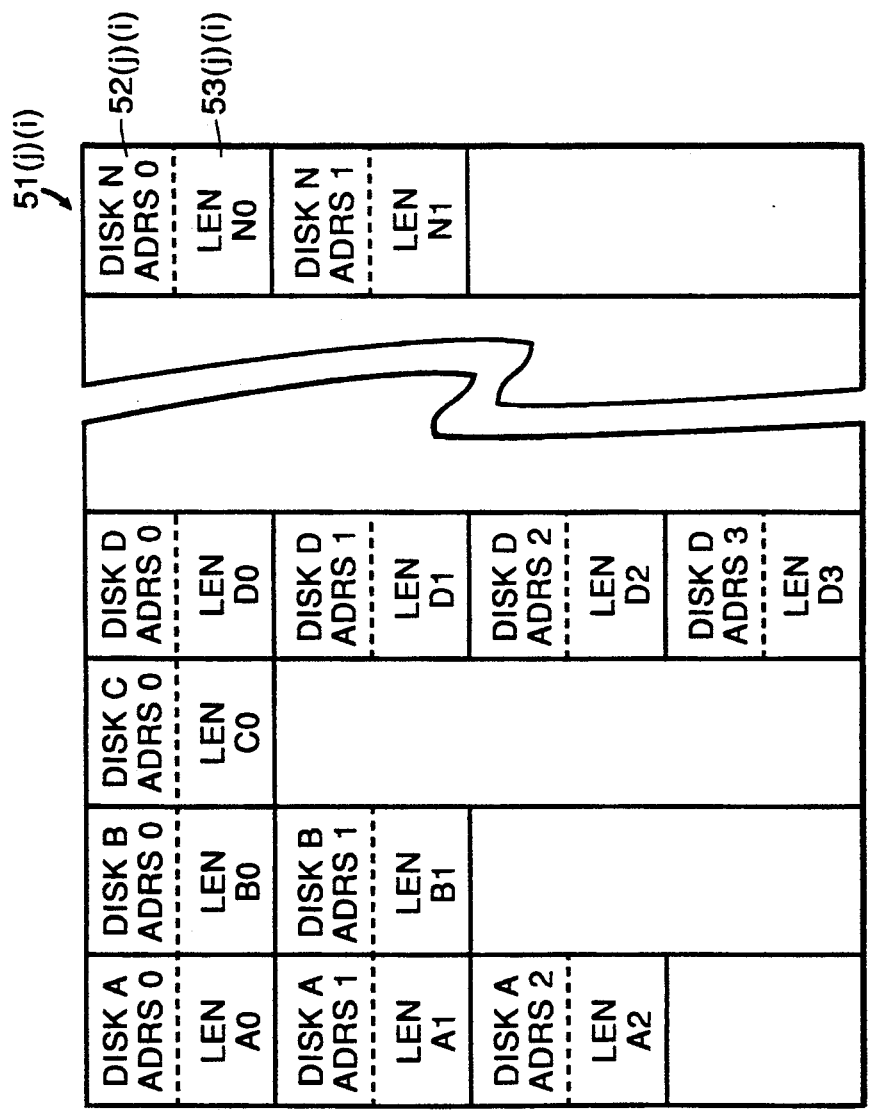
FIG. 2 INDEPENDENT DRIVE MODE TABLE 50

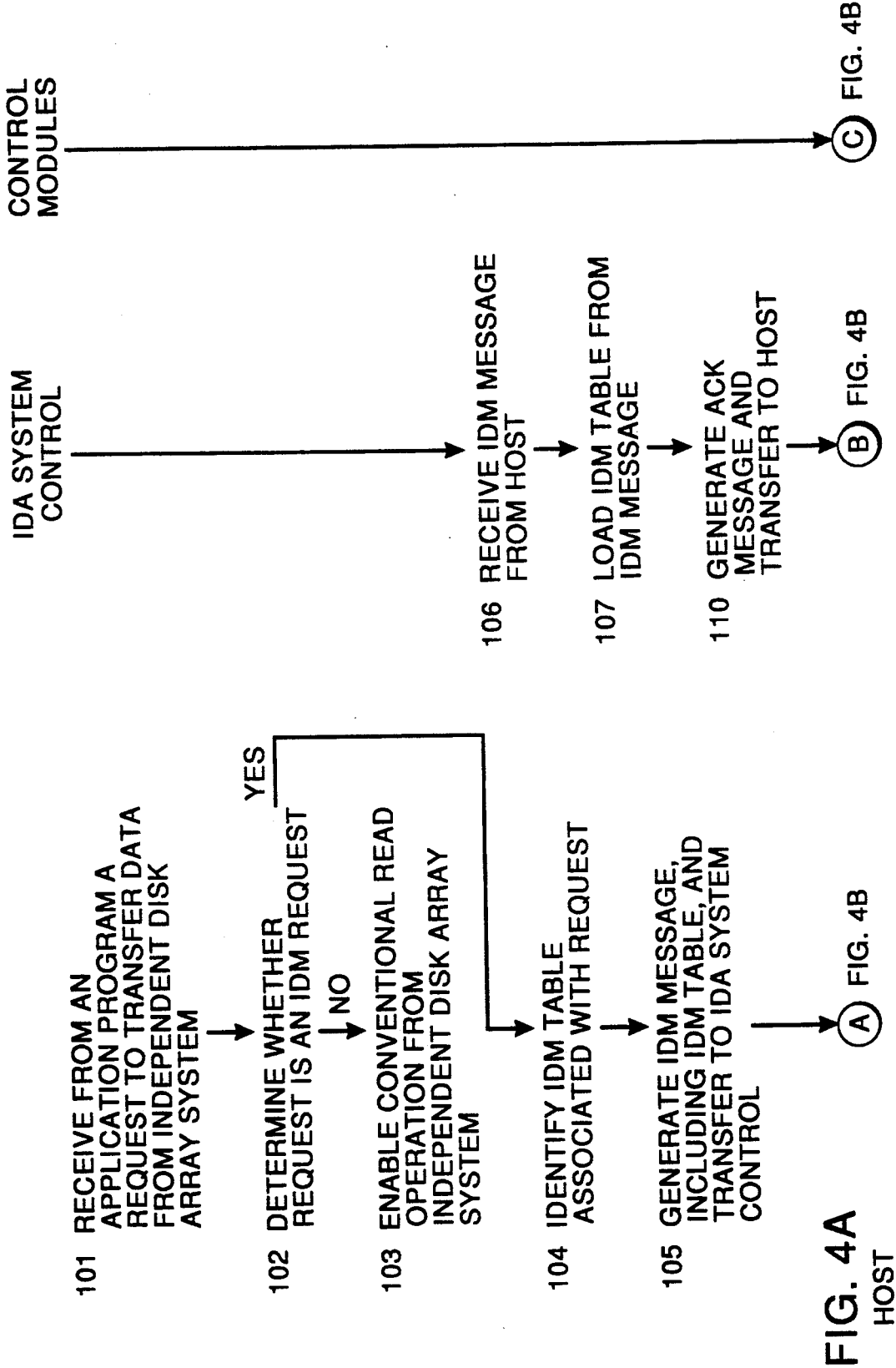

PARALLEL DISK STORAGE ARRAY SYSTEM WITH INDEPENDENT DRIVE OPERATION MODE

INCORPORATION BY REFERENCE

U.S. Pat. No. 4,598,400, issued Jul. 1, 1986, to W. Daniel Hillis, for Method and Apparatus For Routing Message Packets, and assigned to the assignee of the present application, incorporated herein by reference.

U.S. Pat. No. 4,814,973, issued Mar. 21, 1989, to W. Daniel Hillis, for Parallel Processor, and assigned to the assignee of the present application, incorporated herein by reference.

U.S. Pat. No. 4,899,342, issued Feb. 6, 1990, to David Potter, et al., for Method and Apparatus for Operating Multi-Unit Array of Memories, and assigned to the assignee of the present application, incorporated herein by reference.

U.S. patent application Ser. No. 06/732,353, filed May 8, 1985, by W. Daniel Hillis, et al., for "Storage System Using Multiple Mechanically-Driven Storage Units," assignee to the assignee of the present application (hereinafter identified as the Hillis, et al., '353 patent application) incorporated herein by reference.

U.S. patent application Ser. No. 07/043,126, filed Apr. 27, 1987, by W. Daniel Hillis, et al, for Method and Apparatus For Routing Message Packets, and assigned to the assignee of the present application, (hereinafter identified as the Hillis, et al., '126 patent application) incorporated herein by reference.

U.S. patent application Ser. No. 07/179,020, filed Apr. 8, 1988, by Brewster Kahle, et al., for Method and Apparatus For Interfacing Parallel Processors To A Co-Processor, and assigned to the assignee of the present application, (hereinafter identified as the Kahle patent application) incorporated herein by reference.

U.S. patent application Ser. No. 07/518,894, filed May 4, 1990, by David Potter, et al., for Block Data Transfer Arrangement For Massively Parallel Processing System, and assigned to the assignee of the present application, (hereinafter identified as the Potter, et al., patent application) incorporated herein by reference.

FIELD OF THE INVENTION

The invention relates generally to the field of digital data processing systems, and more particularly to mass storage systems for storing digital data. More specifically, the invention relates to mass storage systems in which data is stored in a plurality of separate independently-operable memory units in which bits from words of data are stored, in parallel, in diverse ones of the memory units.

BACKGROUND OF THE INVENTION

Supercomputers, such as those described in the aforementioned Hillis patents, the Hillis, et al., '126 patent application, and the Kahle patent application, process large amounts of data in relatively short periods of time. As in conventional computers, data to be processed by a supercomputer is typically stored in one or more mass storage devices, which generally store the data in magnetic or optical form. To ensure that the processing elements, which actually perform the processing, are kept busy, data must be retrieved from the mass storage devices at a rapid rate for transfer to the processing elements.

The rate at which data can be retrieved from a single mass storage device is related to a number of factors. If the data is stored on a conventional rotating magnetic, disk, for example, the maximum rate at which the data can be retrieved is related to the rotational speed of the disk and the storage density, that is, the number of bits that can be stored per unit length or area on the disk. The data retrieval rate may further be limited by the circuitry that generates, in response to the magnetically-encoded data on the disk, the electronic signals representing the data for transfer to the processing elements. For a typical disk drive, the retrieval rate is generally on the order of several megabytes per second, which is far less than the rate at which a modern supercomputer can receive and process the data.

To increase the rate at which data can be retrieved from mass storage, mass storage systems have been developed comprising arrays of independently controllable disk units. The aforementioned Hillis, et al., '353 patent application and Potter, et al., patent describe examples of such systems. In such a mass storage system, the data bits forming each word to be transferred in parallel to the supercomputer are spread across corresponding locations in a number of independently-operable disk units. In such a system, data can be retrieved from an array of "n" disk units on the order of "n" times faster than from a single disk unit. Accordingly, the amount of data that such a disk array can supply to a supercomputer can more closely match the rate at which the supercomputer can receive and use the data.

Such disk arrays can provide other benefits as well. For example, if each word stored in a disk array is augmented by associated error correction and detection bits, which are stored in additional disk units, if a disk unit fails the data bits that that unit would provide can be decoded from the data bits provided by the other disk units and the error correction and detection bits. Thus, disk arrays can provide not only faster retrieval of data, but also enhanced reliability and availability of data.

Arrays of independently operable disk units can provide an increased retrieval rate for data to be processed if the data to be retrieved from the disk units at one time is stored in the corresponding locations on the disks. If, however, the data to be retrieved from the various disk units is not stored in corresponding locations, parts of the data must be retrieved from diverse locations in the various disk units. When that occurs, the retrieval can take much longer, depending on the amount of data to be transferred from each location and the distances separating the locations on the respective disks.

SUMMARY OF THE INVENTION

The invention provides a new and improved mass storage system, for use in a digital data processing system, including multiple independently operable memory units, in which data can be selectively retrieved both in word-parallel form from the memory units operated in parallel, and in serial form separately retrieved from the memory units operating in an overlapped manner.

In brief summary, the new mass storage system includes a plurality of independently-controllable storage modules, each storage module having a storage element for storing data in a plurality of storage locations and a retrieval arrangement for retrieving data from selected ones of storage locations. A word assembly arrangement receives data from the storage modules in parallel and generates in response thereto data words for transfer to the computer system. A system control module selectively enables the retrieval arrangements of the storage modules to retrieve in parallel data from corresponding storage locations of all of the storage elements, or to retrieve data from diverse locations in selected storage modules.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2 and 3 depict data structures that are useful in understanding the operation of the mass storage system depicted in FIG. 1; and FIGS. 4A through 4C depict a flow diagram that is useful in illustrating the operation of the system depicted in FIG. 1.

DETAILED DESCRIPTION OF AN ILLUSTRATIVE EMBODIMENT

Figure 1:
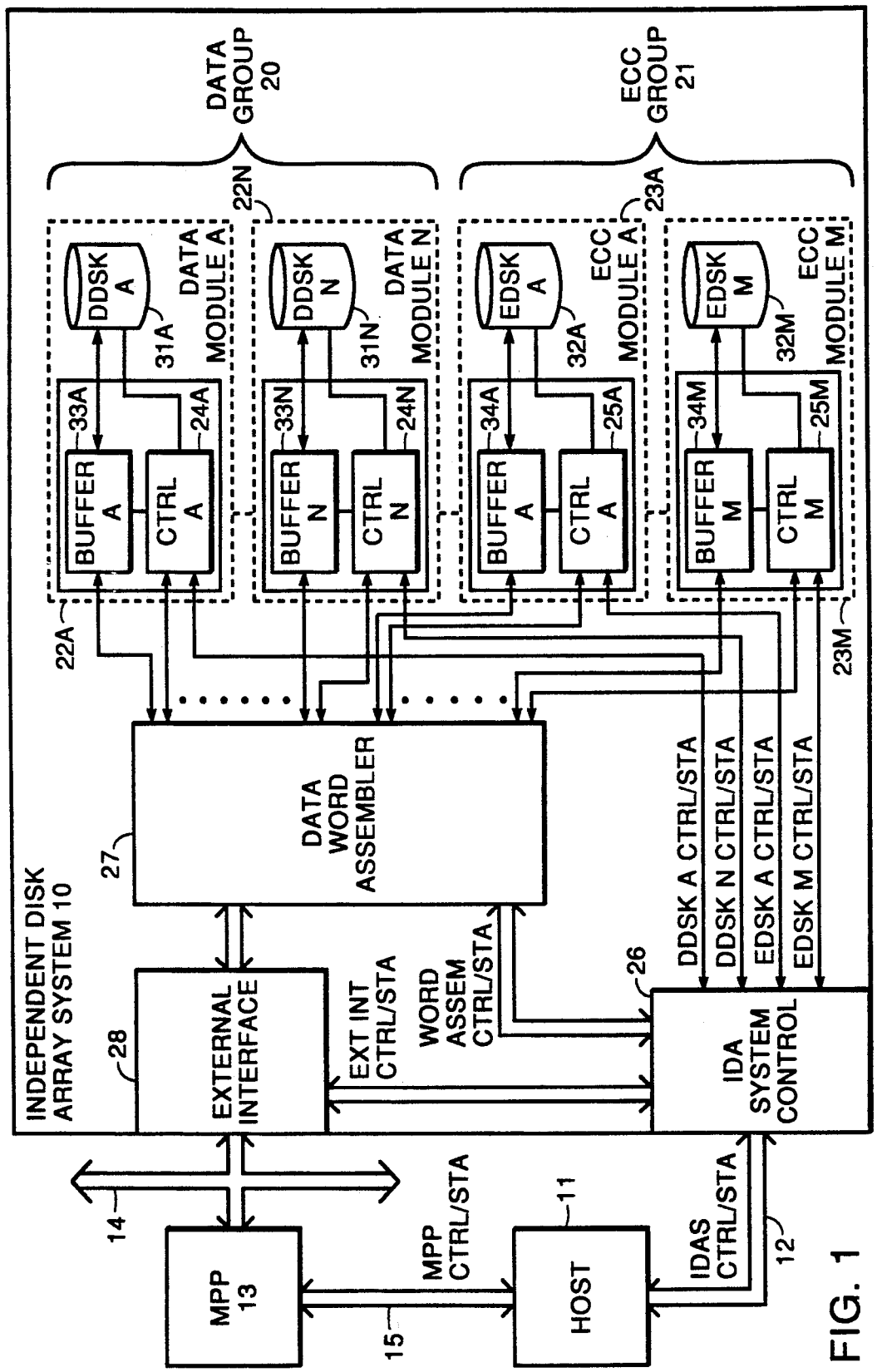
FIG. 1 depicts a functional block diagram of a mass storage system, including an array of multiple independently-operable storage units, constructed in accordance with the invention.

FIG. 1 depicts a functional block diagram of a computer system including a mass storage system, identified as independent disk array system 10, constructed in accordance with the invention. With reference to FIG. 1, system 10 is connected to a host computer 11 over a bus 12 and a sink for data such as a massively parallel processor 13 over a bus 14. The massively parallel processor 13 is also connected to the host computer 11 over a bus 15. In one particular embodiment, the massively parallel processor 13 and host 11 may be similar to those described in the aforementioned Hillis patents, Hillis, et al., '126 patent application and Kahle patent application. The host 11, by means of MPP CTRL/STA control and status signals transmitted over bus 15, controls processing by the massively parallel processor 13.

In addition, the host 11, by means of IDAS CTRL/STA control and status signals transmitted over bus 12, controls the storage of data from the massively parallel processor 13 in the independent disk array system, and the retrieval of data from the independent disk array system 10 for transfer to the massively parallel processor 13 for processing. Data is transferred between the massively parallel processor 13 and the independent disk array system 10 over bus 14. The bus 14 and the transfers thereover between units connected thereto may be similar to that described in the aforementioned Potter, et al., patent application, and will not be described further herein. Bus 14 may also connect the massively parallel processor 13 and independent disk array system 10 to other devices, such as frame buffers, and other massively parallel processors and mass storage systems such as additional independent disk array systems 10.

The independent disk array system 10 includes a plurality of independent disk units divided into two groups, namely a data group 20 and an ECC (error correction code) group 21. Data group 20 includes a plurality of disk units identified as data modules 22A through 22N (generally identified by reference numeral 22$i$) in which data bits are stored. ECC group 21 includes a plurality of disk units identified as ECC modules 23A through 23M (generally identified by reference numeral 23$i$) in which error correction code bits are stored. Each data module 22$i$ includes a control module 24$i$ which controls storage of data bits therein and retrieval of data bits therefrom, and each ECC module 23$i$ includes a control module 25$i$ which controls storage of ECC bits therein and retrieval of ECC bits therefrom.

The control modules 24$i$ and 25$i$ control their respective modules 22$i$ and 23$i$ independently of the other modules, but are controlled and generally synchronized by an independent disk array (IDA) system control module 26, which, in turn, operates under control of commands from the host 11 which it receives over bus 12. Each control module 24$i$ receives control packets in the form of DDSK i CTRL data disk (i) control signals from the IDA system control module 26 to enable control of operations at the respective data module 22$i$, and provides DDSK i STA data disk (i) status signals identifying status of the respective data module 22$i$. In addition, each control module 25$i$ receives similar control packets in the form of EDSK i CTRL ECC disk (i) control signals to enable control of operations at the respective ECC module 23$i$, and provides EDSK i STA ECC disk (i) status signals identifying status of the respective ECC module.

The independent disk array system 10 also includes a data word assembler 27 and an external interface 28. The external interface 28 connects to the bus 14 to enable transfers thereover between the data word assembler and the massively parallel processor 13, or other units connected to the bus 14, under control of the IDA system control module 26. The IDA system control module 26 generates EXT INT CTRL external interface control signals to control operations by the external interface 28, and the external interface generates EXT INT STA external interface status signals to indicate its status to the IDA system control module 26. The data word assembler 27 also operates under control of WORD ASSEM CTRL word assembler control signals from the IDA system control module 26, and generates WORD ASSEM STA word assembler status signals to notify the IDA system control module 26 of its status.

The external interface 28 receives data from the bus 14 in the form of multiple-bit data words, each data word having the same number of bits. In one embodiment the bus 14 carries, along with the data words, error detection bits to facilitate detection of errors in the data words transferred thereover. The external interface 28 uses error detection bits which accompany received data words to verify that the data words were properly received. The external interface transfers the received data words to the data word assembler 27. The external interface 28 also receives data words to be transmitted from the data word assembler 27. For each transmitted data word, the external interface 28 generates the error detection bits to accompany the data words it transmits over the bus 14.

The data word assembler 27 receives received data words provided to it by the external interface 28 and divides them into their constituent bits for storage, in parallel, in the data modules 22$i$. That is, selected bit locations in each received data word are to be stored in each of the data modules 22$i$, and the data word assembler directs the bits from the appropriate bit locations in each data word to the data module 22$i$ to which they are to be stored. The data modules 22i store the bits in corresponding storage locations as described below.

In one specific embodiment, in which a data word has sixty-four bits and the data group 20 has thirty-two data modules 22i, corresponding bits in the first and second thirty-two bit segments of each data word are stored in the successive data modules 22i. That is, bits in bit locations zero and thirty-two in the data word are to be stored in data module 22A, bits in bit locations one and thirty-three are to be stored in data module 22B, and so forth. The data word assembler 27 directs the bits from the bit locations to the appropriate data module 22i. The data word assembler 27 transmits the bits from bit locations in the data word to the various data modules 22i in a coordinated manner. That is, the bits from bit locations in the low-order thirty-two bit segment of a data word, that is, bits in bit locations zero through thirty-one, are transmitted to data modules 22A, 22B, and so forth for storage first, after which bits from the high-order segment of the data word, that is, bit locations thirty-two through sixty-three, from the data word are transmitted to the same data modules.

The data word assembler also generates error correction and detection code (ECC) bits for storage in the ECC modules 23i of the ECC group 21 in the same manner as the data modules 22i store the data bits. As is conventional, the number of ECC bits generated for each set of bits for the data modules 22i depends on the desired degree of detectability or correctability of the bits stored in the data modules 22i. In one specific embodiment having thirty two data modules 22i, seven ECC bits, each stored in a separate ECC module 23i, will permit correction of a single-bit error and detection of a two-bit error.

The data word assembler 27 generates a set of ECC bits for each of the successive sets of data bits that it generates for storage in the data modules 22i. The data word assembler 27 transmits the ECC bits to the ECC modules 23i for storage contemporaneously with its transmission of the data bits for storage in the data modules 22i. Thus, if the connection between the data word assembler 27 and each of the data modules 22i carries a single bit at a time, the data word assembler 27 transmits, in parallel, ECC bits to the ECC modules 23i, one ECC bit being transmitted to each ECC module 23i, simultaneously with the transmission of the associated set of data bits to the data modules 22i.

When data is being retrieved from the independent disk array system 10, specifically from the data modules 22i, for transmission to other units in the system over the bus 14, the data word assembler 27 receives data bits from the data modules 22i, as well as corresponding ECC bits from the ECC modules 23i. The data word assembler 27 uses the ECC bits to verify the correctness of the data bits and corrects the data if it determines that the data is incorrect but correctable. In addition, the data word assembler 27 creates data words in response to the data bits, using a process that is substantially the reverse of that described above, which it transfers to the external interface for transmission over the bus 14.

As noted above, each of the data modules 22i includes a control module 24i for controlling, in response to signals from the IDA system control module 26, its respective data module 22i. Each data module 22i also includes a data store 31i in which the data is actually stored, and a buffer 33i which buffers data from the data word assembler 27 prior to storage in the data store 31i. The buffer 33i also buffers data retrieved from the data store 31i prior to transfer to the data word assembler. In addition, each of the ECC module 23i includes, in addition to the control module 25i, an ECC store 32i and a buffer 34i which perform similar operations in the ECC module.

The operations performed by the respective control modules 24i and 25i depend on the nature of the respective stores 31i and 32i in the data and ECC modules 22i and 23i. Each data and ECC modules 22i and 23i may comprise, for example, a disk drive unit in which the data store 31i and 32i includes a recording media such as one or more magnetic disks, which operate separately and independently of each other, on which the data and ECC bits are stored. The data is written onto and retrieved from the media serially by one or more recording heads. Each recording head may be moved over a disk surface to discrete radial positions from the axis of rotation of the disks, each radial position defining a track. The movement of the recording heads facilitates storage of data on or retrieval of data from a track of the respective disk surface. In such data and ECC modules 22i and 23i, the control modules 24i and 25i control such functions as starting and stopping rotation of the disk(s), moving the heads, and enabling data to be transferred between the data word assembler 27 and the respective buffer 33i or 34i. In addition, the control modules 24i and 25i select one of the recording heads and enable it to store data from the respective buffer 33i or 34i on the recording medium during a storage operation or to read data from the recording medium and transfer it to the respective buffer 33i or 34i during a retrieval operation.

As described in the aforementioned Hillis, et al., '353 patent application and in the aforementioned Potter, et al., patent, the data and ECC bits are stored in, and retrieved from, the respective data and ECC modules 22i and 23i generally in parallel. That is, the data and ECC bits transferred in parallel from the data word assembler 27 to the data and ECC modules 22i and 23i (or the data and ECC bytes, if the connection between the data word assembler 27 and each data and ECC module 22i and 23i transfers bytes in parallel as described above) are written to the same locations in the respective data and ECC modules 22i and 23i.

The data and ECC modules 22i and 23i perform these storage and retrieval operations, under control of the IDA system control module 26, generally in parallel. That is, the data and ECC modules 22i and 23i receive the DDSK i CTRL data disk (i) control signals and EDSK (i) CTRL ECC disk (i) control signals that enable such operations in parallel; however, it will be appreciated that, for example, since the storage media in the modules 22i and 23i may be at different points in their rotations and the recording heads may not move at precisely the same rates in the modules 22i and 23i, the modules 22i and 23i may not be able to actually begin writing data or ECC bits onto the media, or retrieve them from the media, in precise synchrony.

With these limitations, during a storage operation the data modules 22i and ECC modules 23i, in parallel, store corresponding data and ECC bits received from the data word assembler 27 in parallel in corresponding locations on their respective storage media. In addition, during a retrieval operation the data and ECC modules 22i and 23i, in parallel, retrieve corresponding data and ECC bits from corresponding locations on the storage media for transfer to the data word assembler 27. As described in the aforementioned Hillis, et al., '353 application and Potter, et al., patent, a benefit of this arrangement is that the data bits normally provided by all of the data modules 22i can be available even if one of the data modules 22i malfunctions, since the ECC bits supplied by the ECC modules 23i can be used by the data word assembler 27 to provide a corrected data bit.

As noted above, the data and ECC modules 22i or 23i also provide DDSK i STA data disk (i) status signal and EDSK i STA ECC disk (i) status signal, as appropriate to the IDA system control module 26 indicating their respective status. The status may indicate, for example, whether the respective module 22i or 23i has finished its transfer, whether the transfer was without error, and so forth. The IDA system control module 26 may use these status signals, as well as the status signals from the data word assembler 27 and the external interface 28, in determining the status of a transfer operation, and may notify the host 11 when the status signals indicate that the transfer operation has been completed.

In accordance with the invention, the data modules 22i of the independent disk array system 10 also can operate in an independent drive mode, in which system 10 retrieves data, in contemporaneously, from diverse locations of the storage media of the respective data modules 22i. This permits the host 11, specifically an applications program controlling the host 11, to enable data previously stored on various locations of the media of different data modules 22i to be retrieved contemporaneously and transferred in parallel over the bus 14. The operations performed by the host 11, the IDA system control module 26 and the control modules 24i to accomplish this will be described in detail in connection with the flow chart depicted in FIGS. 4A through 4C. Preliminarily, it would be helpful to describe a data structure generated by the host 11 and the structure of messages transferred between host 11 and the IDA system control module 26, which are depicted in FIGS. 2 and 3, respectively.

With reference to FIG. 2, in initiating an independent drive mode operation, the applications program controlling host 11 provides an independent drive mode table 50. The table 50 includes a plurality of entries 51(j) (i) arranged in a number of rows, identified by index (j), and columns, identified by index (i). Each column of entries is associated with a data module 22i. Each entry 51(j) (i) includes two portions, including a start address portion 52(j) (i) and a length portion 53(j) (i). The start address portion 52(j) (i) identifies the first location, in the data module 22i, from which data is to be retrieved, and the length portion 53(j) (i) identifies the amount of data to be retrieved. The successive entries 51(j) (i) in each column (i) defines the successive portions of data to be retrieved from the associated data module 22i, in the order in which the data is to be retrieved. Thus, since the table 50 includes a column (i) for each data module 22i, the table 50 identifies the data to be retrieved from all of the data modules 22i for the independent drive mode operation.

As shown in FIG. 2, the columns (i) of the independent drive mode table 50 may include different numbers of entries 51(j) (i) identifying data to be retrieved. The application program generating table 50 may define the table 50 by identifying the number of entries 51(j) (i) in each column. Alternatively, the application program may define the table by identifying the number of entries 51(j) (i) in the column (i) having the largest number of entries, and pad the other columns with entries having null starting addresses and lengths in portions 52(j) (i) and 53(j) (i) until all columns have the same length. In the following description, the columns of the table 50 are deemed to be padded so that all have the same length.

To initiate an independent drive mode operation by the independent disk array system 10, the host 11 transmits a message to the IDA system control module 26 over the bus 12. FIG. 3 depicts the structure of such a message 60. With reference to FIG. 3, the message includes a number of fields. A file descriptor field 61 includes a file descriptor that identifies the file containing the data to be retrieved. The file descriptor contained in the field 61 may be similar to the file descriptor provided by the Unix ® operating system, uniquely identifying the file in the computer system. A bus identification field 62 contains a bus identification value that the independent disk array system 10 uses in connection with transfers over the bus 14 as described in the aforementioned Potter, et al., application. In particular, the bus identification value identifies the unit that is to receive data that the independent disk array system 10 is to transfer over the bus 14, such as, for example, the massively parallel processor 13, in response to the message 60.

The remaining fields of the message 60 relate to the independent drive mode table 50 (FIG. 2). In particular, the message 60 includes a depth field 63 that identifies the number of entries 51(j) (i) in the table 50 and a spread field 64 that identifies the number of columns (i) in the table. In addition, the message 60 includes a field 65 that contains the actual table 50. It will be appreciated that the various rows (j) of table 50 will generally not be transferred over bus 12 in parallel, but instead in either column-serial or row-serial fashion, and if the columns have been padded to the same length the IDA system control module 26 can use the depth and spread information in fields 63 and 64 to identify the rows (j) and columns (i) for each of the entries 51(j) (i).

Alternatively, if, for example, the table 50 transferred over bus 12 in column-serial fashion, instead of each column may be preceded by a length identifier or terminated by a column terminator symbol, and the IDA system control module 26 may identify the rows (j) and columns (i) for each of the entries (j) (i) using that information. Length identifiers or column terminator symbols may be particularly useful if the columns (i) of the table 50 have not been padded to the same length.

Figure 4B:
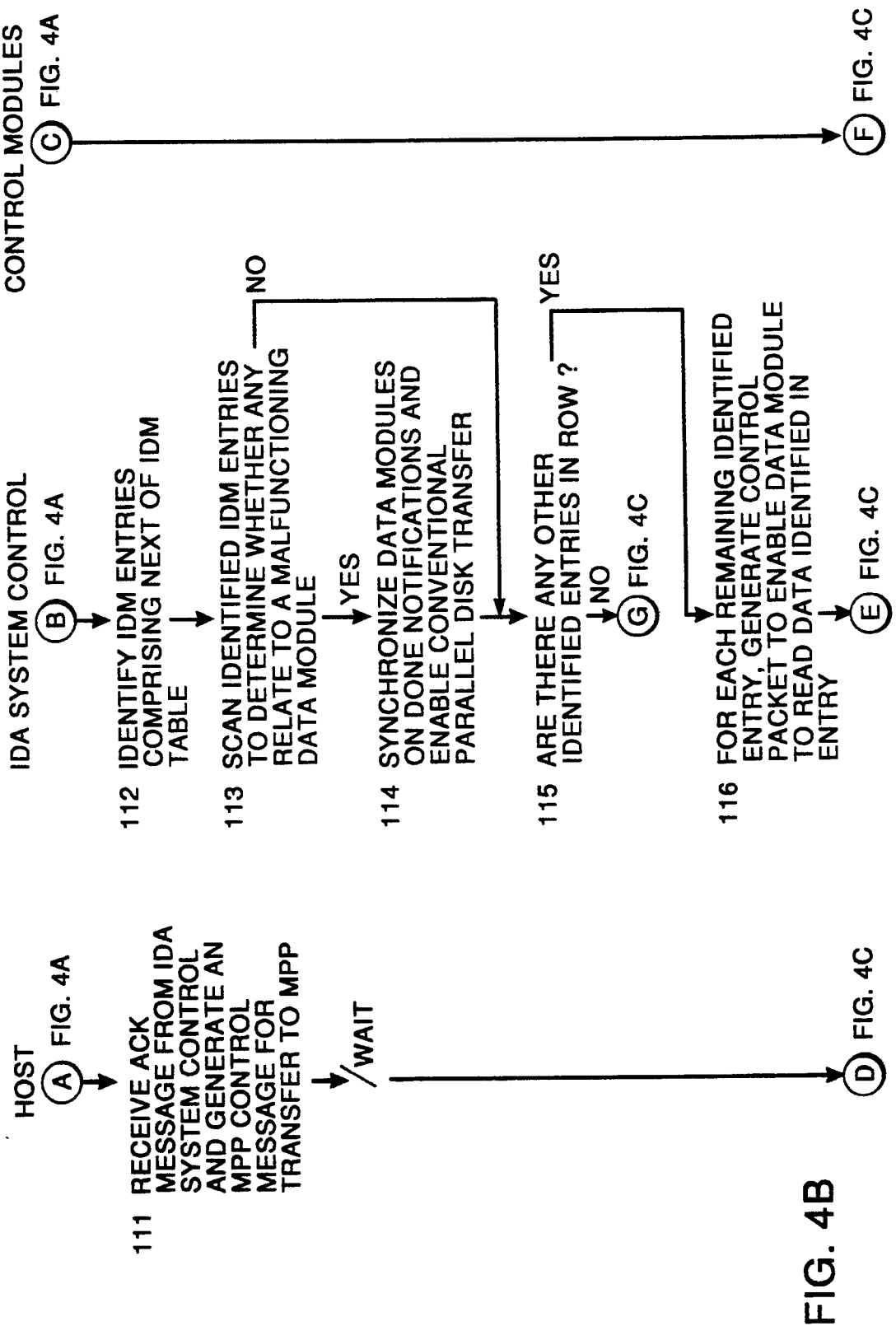
Figure 4C:
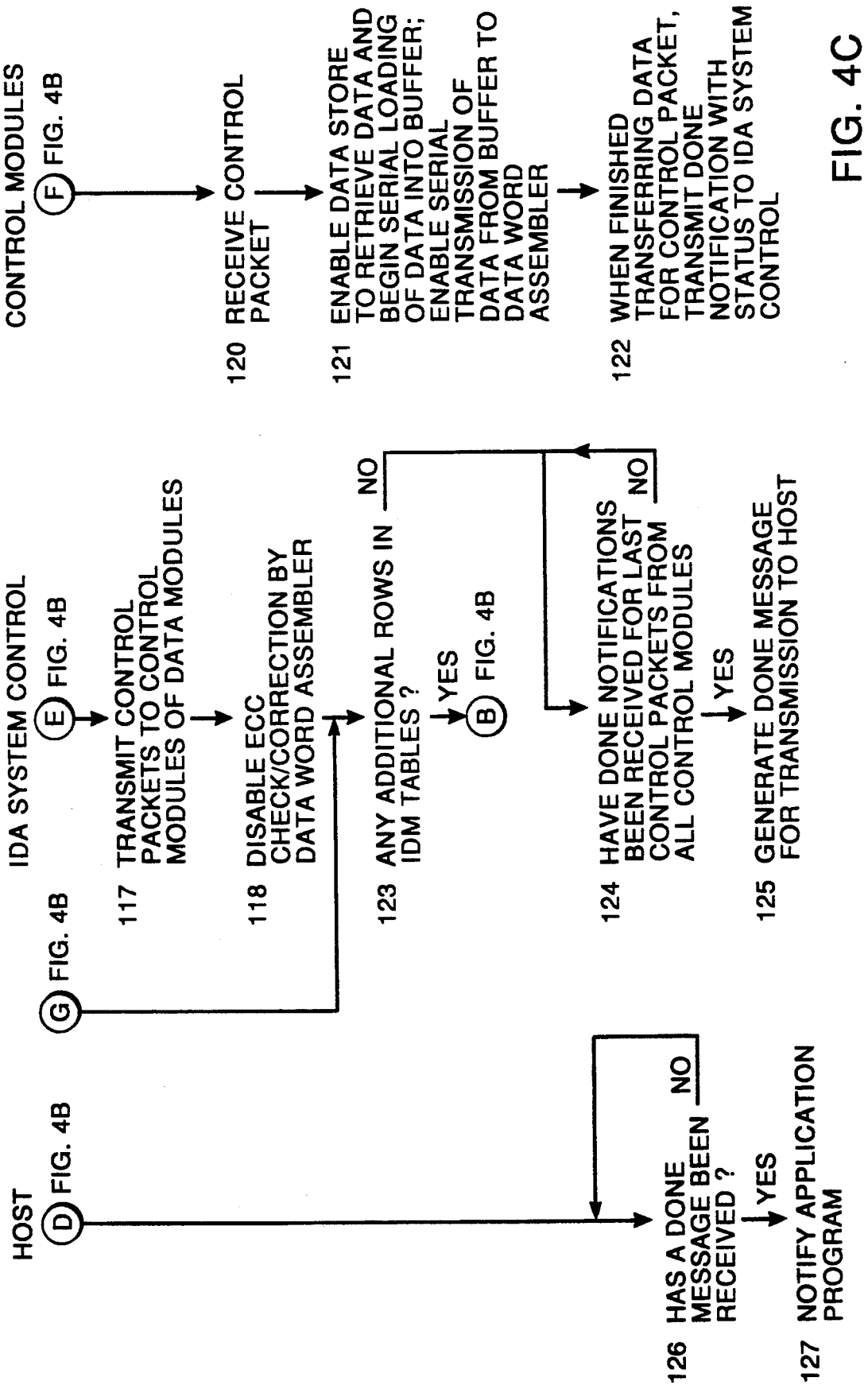

With this background, the operations performed by the computer system depicted in FIG. 1 during an independent drive mode operation will be described in connection with FIGS. 4A through 4C. With reference to FIG. 4A, the applications program being processed by the host 11 generates an independent drive mode table 50 (FIG. 2) comprising the entries 51(j) (i) identifying the data to be retrieved from each data module 22i. The applications program generates a transfer request, including the independent drive mode table 50, to the host's operating system (step 101).

Upon receiving the transfer request, the operating system determines whether the request is an independent drive mode request (step 102). If the request is not an independent drive mode request, but instead requests parallel transfers of data from corresponding locations of the data modules 22i, the host 11 enables the independent disk array system 10 to perform a transfer, as described above and in the aforementioned Hillis, et al., '353 patent application and Potter, et al., patent (step 103). This mode of operation is generally described above, and is described in more detail in the Hillis, et al., '353 patent application and Potter, et al., patent and will not be further described here.

On the other hand, if the host's operating system determines in step 102 that the request is an independent drive mode request, it sequences to step 104, in which it identifies the independent drive mode table associated with the request and generates a message 60 (FIG. 3), which it transfers over the bus 12 to the independent disk array system 10, specifically the IDA system control module 26 (step 105). The IDA system control module 26 of the independent disk array system 10 receives the message 60 from the bus 12 (step 106) and initiates a transfer operation in response thereto. In this operation, the IDA system control module 26 initially loads the table 50 from the message 60 (step 107) and generates an acknowledgement message which it returns to the host 11 (step 110). Upon receipt by the host 11 of the acknowledgement message, the host operating system generates another message for transfer to the unit that is to receive the retrieved data, such as the massively parallel processor 13, to enable it to receive the retrieved data (step 111).

As noted above, in connection with steps 107 and 110, the IDA system control module 26 receives message 60 and loads the table 50 from the message 60 (step 111). Thereafter, the IDA system control module 26 identifies the entries 51(j) (i) in the first row of the table 50 (step 112). The IDA system control module 26 then scans the entries 51(j) (i) to determine whether any relate to a data module 22i that is malfunctioning, or that is otherwise unable to engage in a transfer operation. If an entry 51(j) (i) in the first row does relate to such a data module 22i, the IDA system control module 26 sequences to step 114. In step 114, the IDA system control module 26 enables a conventional parallel retrieval of data and ECC bits from the storage locations, corresponding to that identified in the entry 51(j) (i), in all of the data modules and ECC modules 22i and 23i, as described above. In addition, the IDA system control module 26 enables the data word assembler 27 to use the ECC bits to provide the correct data for the malfunctioning data module 22i.

Following step 114, or step 113 if the IDA system control module 26 determines there that the entries 51(j) (i) in the first row of the table 50 do not relate to a data module 22i that is unable to engage in a transfer operation, the IDA system control module 26 sequences to step 115 in which it determines whether there are any remaining entries in the first row that have not been processed. If so, the IDA system control module 26 generates a control packet for each entry 51(j) (i) in the row to enable the associated data module 22i to retrieve the data identified in the entry 51(j) (i) (step 116). In particular, each control packet includes such information as the type of operation to be performed by the data module 22i, in this case a retrieval operation, and identifies the starting location and length, or the amount of data to be transferred.

After generating the control packets, the IDA system control module 26 transmits them, as DDSK i CTRL data disk (i) control signals to the control modules 24i of the respective data modules 22i (step 117). Thereafter, the IDA system control module 26 disables the ECC checking and correction by the data word assembler 27 (step 118). This enables the data word assembler 27 to form data words, to be transferred to the external interface 28, using the data it receives from the data modules 22i without performing an ECC checking or correction operation.

The control modules 24i of the respective data modules 22i receive the control packets (step 120) and enable their respective data stores 31i to retrieve the requested data (step 121). In particular, the control modules 24i that receive a control packet enable their respective data stores 31i to begin retrieving the data and load it into the respective buffers 33i. The data word assembler 27 receives the successive bits of the retrieved data and forms data words therefrom for transfer to the external interface 28. If a data module 22i does not receive a control packet, and thus is not to retrieve data, it does not supply data to the data word assembler 27; in the bit locations of a data word created by the data word assembler 27 that would normally be supplied by the data module 22i, the data word assembler 27 inserts bits of value zero. When each module 22i has finished its retrieval operation, it may send an appropriate status notification to the IDA system control module 26 (step 122).

The IDA system control module 26, upon receiving a status notification from a control module 24i, determines whether there are any additional rows in the table 50 (step 123). If the IDA system control module 26 determines that table 50 does include an additional row, it returns to step 112 to perform steps 113 through 118 in connection with the entries 51(j)(i) in the next row. It will be appreciated that, if the IDA system control module 26 determines in step 113 that an entry 51(j)(i) in that row relates to a data module 22i whose data retrieval requires use of the ECC modules 23i, the IDA system control module 26 will wait until all of the data modules 22i have finished their last retrievals before enabling a parallel retrieval from corresponding locations in all of the data and ECC modules 22i and 23i. In addition, the IDA system control module 26 will re-enable ECC checking and correction by the data word assembler 27 so that the data can be properly retrieved.

The IDA system control module 26 will perform steps 112 through 118 and 123 iteratively until it determines, in step 123, that it has processed entries 51(j)(i) in all of the rows of the table 50. In addition, control modules 24i will perform steps 120 through 122 iteratively until they have processed and retrieved data for all of the control packets that they receive from the IDA system control module 26.

When the IDA system control module 26 determines, in step 123, that it has generated control packets for entries 51(j)(i) in all of the rows of the table 50, it sequences to step 124 in which it waits for the notifications from the respective control modules 24i that they have completed retrievals for all of the control packets transmitted thereto. When the IDA system control module 26 receives all such notifications, it generates a message for transmission to the host 11 indicating that the independent drive mode operation has been completed (step 125). The host 11 then notifies the applications program that the retrieval operation has been completed (step 127).

The IDA system control module 26 can be controlled to process entries 51(j)(i) in successive rows of the table 50 (relating to step 123) in a number of ways. For example, the IDA system control module 26 can wait until it receives a notification from at least one control module 24i indicating that it has finished a transfer for an entry 51(j)(i) in a previous row before returning to step 112 to process the next row of entries 51(j)(i).

Alternatively, the IDA system control module 26 can maintain a work queue (not shown) for each data module 22i and iteratively generate control packets and enqueue them in the respective work queue until either control packets have been generated for all of the entries 51(j)(i) or the work queues are full. In the latter case, as the control packets are removed from the work queues, the IDA system control module 26 can generate control packets for the remaining entries 51(j)(i) in the table. If the IDA system control module 26 determines that an entry 51(j)(i) relates to a malfunctioning data module 22i, for example, requiring parallel retrieval from all data modules and the ECC modules 23i, it can stop enqueuing control packets at that point, and enable a parallel retrieval (step 114) after the data modules 22i have performed the retrieval operations for the previously-enqueued control packets.

In addition, it will be appreciated that, depending on the nature of the data modules 22i, and in particular the capabilities of their respective control modules 24i, the IDA system control module 26 may generate multiple control packets for each entry 51(j)(i). For example, typically a retrieval operation from a data module 22i will require the control module 24i to first perform a seek operation to move the recording head to the proper track if it is not there already, and after the recording head has reached the proper track to actually enable retrieval of the data. If the control modules 24i are capable of inferring that a seek operation is required from a control packet enabling a retrieval from a different disk address than that at which the recording head is currently located, a single control packet may suffice. However, if the control modules 24i do not have such capability, the IDA system control module 26 will have to generate control packets enabling the control modules 24i to initiate seek operations, followed by control packets enabling the retrieval operation.

Furthermore, while the independent disk array system 10 has been generally described as having data and ECC modules 22i and 23i in which data stores 31i and 32i is stored on magnetic disks, it will be appreciated that the data stores may instead comprise magnetic tape and optical disks. In addition, the data stores 31i and 32i may comprise electronic memories which may emulate disk or tape stores.

The invention provides a number of advantage. It can, for example, provide the advantages of an independent disk array, as noted above, as the data to be retrieved from malfunctioning data modules 22i can be constructed from data retrieved in parallel from non-malfunctioning data modules 22i and the ECC modules 23i, while contemporaneously data can be retrieved, contemporaneously but not in parallel, from diverse locations of the data modules.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A mass storage system for connection to a computer comprising:
A. a plurality of independently-controllable data storage modules, each data storage module having a storage medium for storing data in a plurality of addressable storage locations and data storage and retrieval arrangement controllable to store data on and retrieve data from selected ones of the storage locations during storage and retrieval operations, respectively;
B. at least one error detection information storage module including a storage medium for storing error detection information in a plurality of addressable storage locations and data storage and retrieval arrangement controllable to store error detection information on and retrieve error detection information from selected ones of the storage locations during storage and retrieval operations, respectively;
C. a word assembly arrangement for:
  i. during a storage operation, receiving data words from the computer and generating in response thereto data and error detection information for transfer in parallel to the data storage modules and error detection information storage module, respectively; and
  ii. during a retrieval operation, receiving data from the data storage modules and generating in response thereto data words for transfer to the computer, said word assembly arrangement further receiving error detection information from said error detection information storage module and selectively using said error detection information in an error detection and correction operation in generating data words for transfer to the computer; and
D. a storage system control module for generating control information to
  i. control the word assembly arrangement, said data storage modules and said error detection information storage module during a storage operation; and
  ii. selectively during a retrieval operation:
    (a) in a parallel retrieval mode, enable the data storage modules and said error detection information storage module to retrieve in parallel data and error detection information from corresponding storage locations of all of the storage media, said control information in said parallel retrieval mode enabling said word assembly arrangement to use the error detection information to perform an error detection and correction operation in connection with the data it receives from the data storage modules, and to use the data from a plurality of the data storage modules in generating data words for transfer to the computer; or
    (b) in an independent retrieval mode, enable the data storage modules to retrieve data from diverse storage locations on their respective storage media, said control information in said independent retrieval mode enabling the word assembly arrangement to form data words for transfer to the computer in response to the data it receives from the data storage modules, without performing and error detection and correction operation in connection with error detection information from the error detection information storage module.

2. A mass storage system as defined in claim 1 in which during said independent retrieval mode, the storage system control module operates in response to an independent retrieval mode table identifying for each storage module the storage locations whose data is to be retrieved from the respective storage module, the storage system control module enabling the data storage modules to retrieve data from the identified storage locations and transfer the retrieved data to the word assembly arrangement.

3. A mass storage system as defined in claim 2 in which the independent retrieval mode table includes a plurality of entries organized in a plurality of columns each associated with a data storage module, at least one column having at least one entry identifying storage locations whose data is to be retrieved, said storage system control module coupling entries from each column to the associated storage module to thereby enable the storage module to retrieve data from storage locations as identified in the entry.

4. A mass storage system as defined in claim 3 in which each entry in the independent retrieval mode table includes a starting storage location and a data length, for each entry received by a said storage module, the storage module retrieving an amount of data corresponding to the data length specified in the entry.

5. A mass storage system for connection to a computer, the computer generating storage requests each for initiating a storage operation and retrieval requests each for initiating a retrieval operation, each the retrieval requests including a mode identifier identifying either a parallel retrieval mode or an independent retrieval mode, said mass storage system comprising:

A. a plurality of independently-controllable data storage modules, each data storage module having a storage medium for storing data in a plurality of addressable storage locations and data storage and retrieval arrangement controllable to store data on and retrieve data from selected ones of the storage locations during storage and retrieval operations, respectively;

B. a word assembly arrangement for:
  i. during a storage operation, receiving data words from the computer and generating data for transfer in parallel to the data storage modules; and
  ii. during a retrieval operation, receiving data from the data storage modules and generating in response thereto data words for transfer to the computer; and C. a storage system control module for generating control information to
  i. control the word assembly arrangement, said data storage modules and said error detection information storage module during a storage operation; and
  ii. selectively during a retrieval operation:
    (a) in a parallel retrieval mode, enable the data storage modules to retrieve in parallel data from corresponding storage locations of all of the storage media as identified by unitary storage location identification information received with a retrieval request from the computer; or
    (b) in an independent retrieval mode, enable the data storage modules to retrieve data from diverse storage locations on their respective storage media as individually identified by storage location identification information received with a retrieval request from the computer.

6. A mass storage system as defined in claim 5 in which, in independent retrieval mode, storage location identification information received with a retrieval request includes an independent retrieval mode table identifying for each storage module the storage locations whose data is to be retrieved from the respective storage module, the storage system control module enabling the data storage modules to retrieve data from the identified storage locations and transfer the retrieved data to the word assembly arrangement.

7. A mass storage system as defined in claim 6 in which the independent retrieval mode table includes a plurality of entries organized in a plurality of columns each associated with a data storage module, at least one column having at least one entry identifying storage locations whose data is to be retrieved, said storage system control module coupling entries from each column to the associated storage module to thereby enable the storage module to retrieve data from storage locations as identified in the entry.

8. A mass storage system as defined in claim 7 in which each entry in the independent retrieval mode table includes a starting storage location and a data length, for each entry received by a said storage module, the storage module retrieving an amount of data corresponding to the data length specified in the entry.

* * * * *